United States Patent
Treyz

(10) Patent No.: US 7,651,613 B2
(45) Date of Patent: Jan. 26, 2010

(54) AIRCRAFT FILTER DEVICE WITH A MEMBER FOR KEYING AND DRIVING THE CARTRIDGE

(75) Inventor: Alain Treyz, Antony (FR)

(73) Assignee: Messier-Bugatti, Velizy Villacoublay (FR)

( * ) Notice: Subject to any disclaimer, the term of this patent is extended or adjusted under 35 U.S.C. 154(b) by 0 days.

(21) Appl. No.: 12/400,289

(22) Filed: Mar. 9, 2009

(65) Prior Publication Data

US 2009/0230046 A1    Sep. 17, 2009

(30) Foreign Application Priority Data

Mar. 14, 2008    (FR)    .................................    08 01407

(51) Int. Cl.
    *B01D 27/08*    (2006.01)
    *B01D 35/30*    (2006.01)
(52) U.S. Cl. ...................... 210/232; 210/235; 210/444
(58) Field of Classification Search ................. 210/232, 210/235, 444

See application file for complete search history.

(56) References Cited

U.S. PATENT DOCUMENTS 2,991,885 A * 7/1961 Gutkowski .................. 210/133
6,177,003 B1 * 1/2001 Jainek et al. .................. 210/85
7,132,048 B2 * 11/2006 Hagashihara ............... 210/232

FOREIGN PATENT DOCUMENTS

DE    19644646 A1    4/1998

* cited by examiner

*Primary Examiner*—Thomas M Lithgow
(74) *Attorney, Agent, or Firm*—Sughrue Mion, PLLC

(57) ABSTRACT

The invention relates to an aircraft filter device comprising a hydraulic block adapted to receive removably a filter (2) comprising a vessel (3) receiving a cartridge (4), wherein the vessel is fitted internally with a pin (6) of elastically deformable material comprising firstly a key (8) that extends towards the opening of the vessel and that includes a curved end (9) that projects beyond an edge of the vessel, and secondly a finger (10) that extends towards the bottom of the vessel, and that is oriented towards the center thereof, so that when a cartridge is put into place in the vessel, the finger is pushed back by the cartridge and forces the key to retract so that its curved end no longer projects radially from the vessel, the cartridge being fitted with an external obstacle (14) that cooperates with one end of the finger in order to prevent the cartridge being withdrawn from the vessel.

3 Claims, 4 Drawing Sheets

AIRCRAFT FILTER DEVICE WITH A MEMBER FOR KEYING AND DRIVING THE CARTRIDGE

The invention relates to a filter device for an aircraft hydraulic circuit, the device including a keying and drive member.

BACKGROUND OF THE INVENTION

Filter devices are known for aircraft hydraulic circuits, said devices comprising at least one cartridge filter that is separably fastened to a hydraulic block. The filter comprises a vessel that receives a filter cartridge. The vessel is screwed to the hydraulic block.

It sometimes happens that the vessel is mounted on the hydraulic block even though a cartridge has not been placed inside the vessel. When removing the filter, it can also happen that the cartridge does not come away with the vessel but remains attached to the hydraulic block, e.g. because of resistance from a gasket carried by a member internal to the block and co-operating, in service, with the cartridge.

OBJECT OF THE INVENTION

An object of the invention is to provide a filter device designed to avoid those two drawbacks.

BRIEF SUMMARY OF THE INVENTION

According to the invention, there is provided an aircraft filter device comprising a hydraulic block adapted to receive removably a filter comprising a vessel receiving a cartridge, wherein the vessel is fitted internally with a pin of elastically deformable material comprising firstly a key that extends towards the opening of the vessel and that includes a curved end that projects beyond an edge of the vessel, and secondly a finger that extends towards the bottom of the vessel, and that is oriented towards the center thereof, so that when a cartridge is put into place in the vessel, the finger is pushed back by the cartridge and forces the key to retract so that its curved end no longer projects radially from the vessel, the cartridge being fitted with an external obstacle that co-operates with one end of the finger in order to prevent the cartridge being withdrawn from the vessel.

Thus, the finger of the pin has a function of driving the key so that it retracts when a cartridge is in place in the filter, and also the filter of retaining the cartridge in the vessel. Thus, with a simple resilient member, preferably made of spring steel, both of the above-mentioned problems can be solved.

Advantageously, the pin comprises a belt engaged in an annular groove inside the vessel, the key and the finger extending from opposite sides of the belt.

BRIEF DESCRIPTION OF THE DRAWINGS

The invention can be better understood in the light of the following description given with reference to the figures of the accompanying drawings, in which.

DETAILED DESCRIPTION OF THE INVENTION

Figure 1:
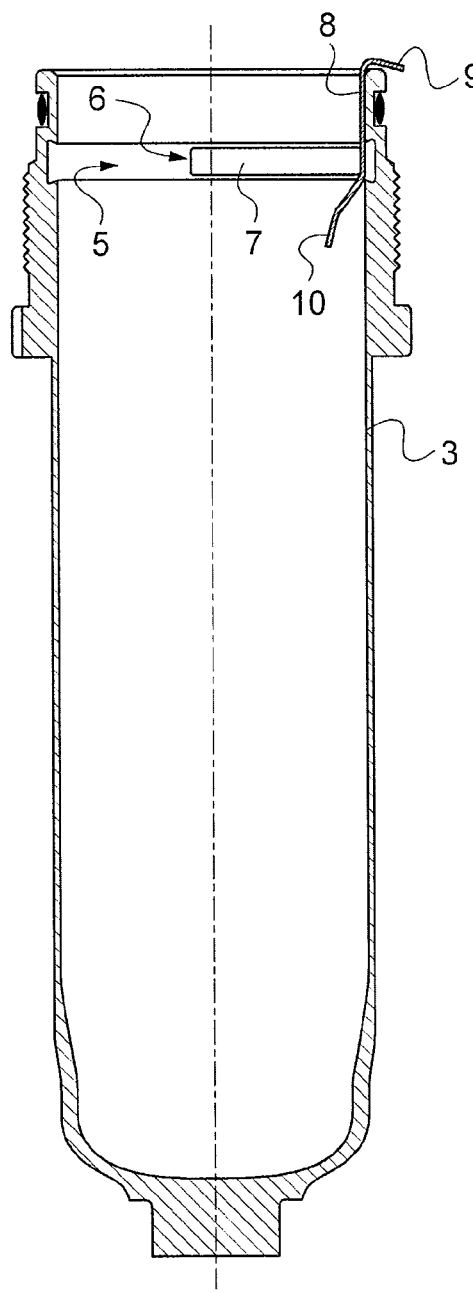
FIG. 1 is a longitudinal section view of a filter vessel of a filter device in a particular embodiment of the invention.
Figure 2:
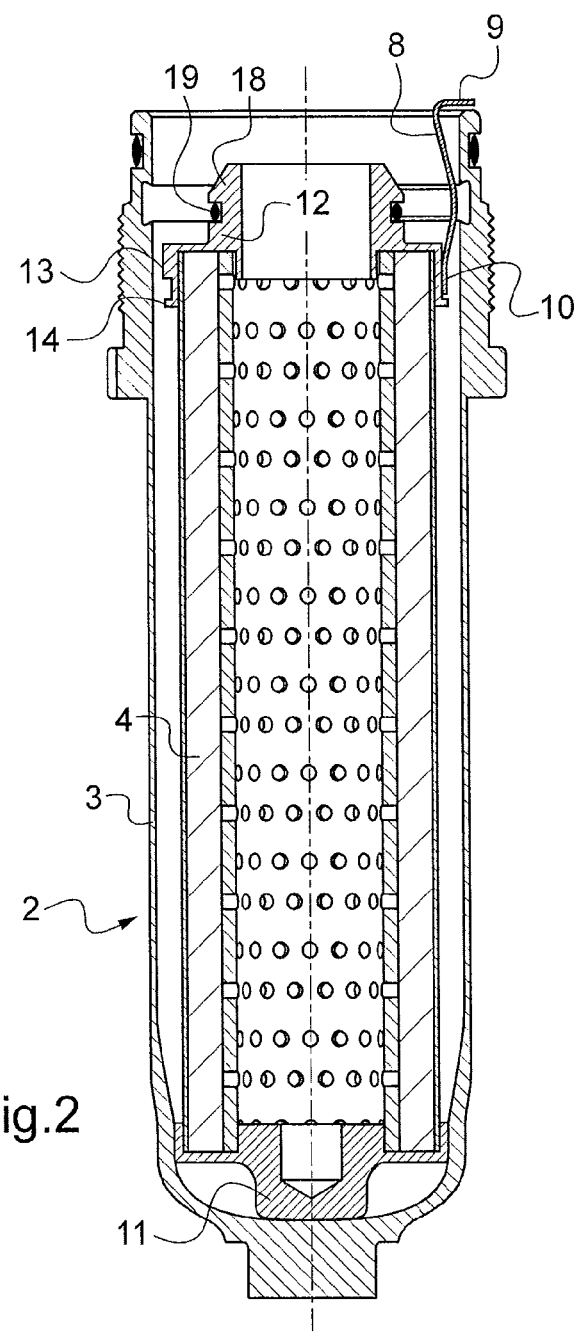
FIG. 2 is a view analogous to FIG. 1 showing the FIG. 1 vessel with a cartridge inserted therein.
Figure 3:
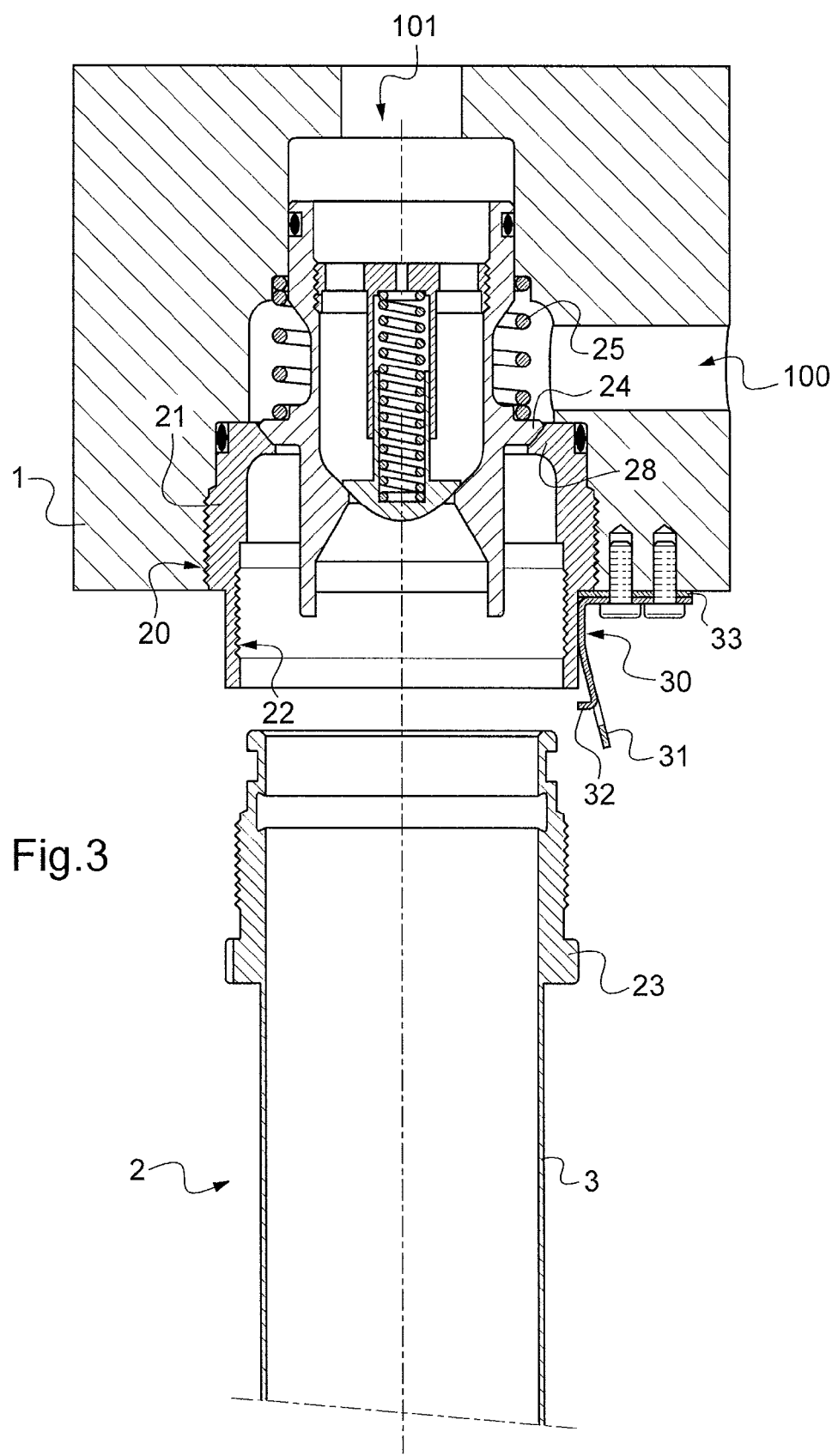
FIG. 3 is a longitudinal section view of the filter device in which the filter vessel is presented to the hydraulic block while the vessel does not contain any cartridge.
Figure 4:
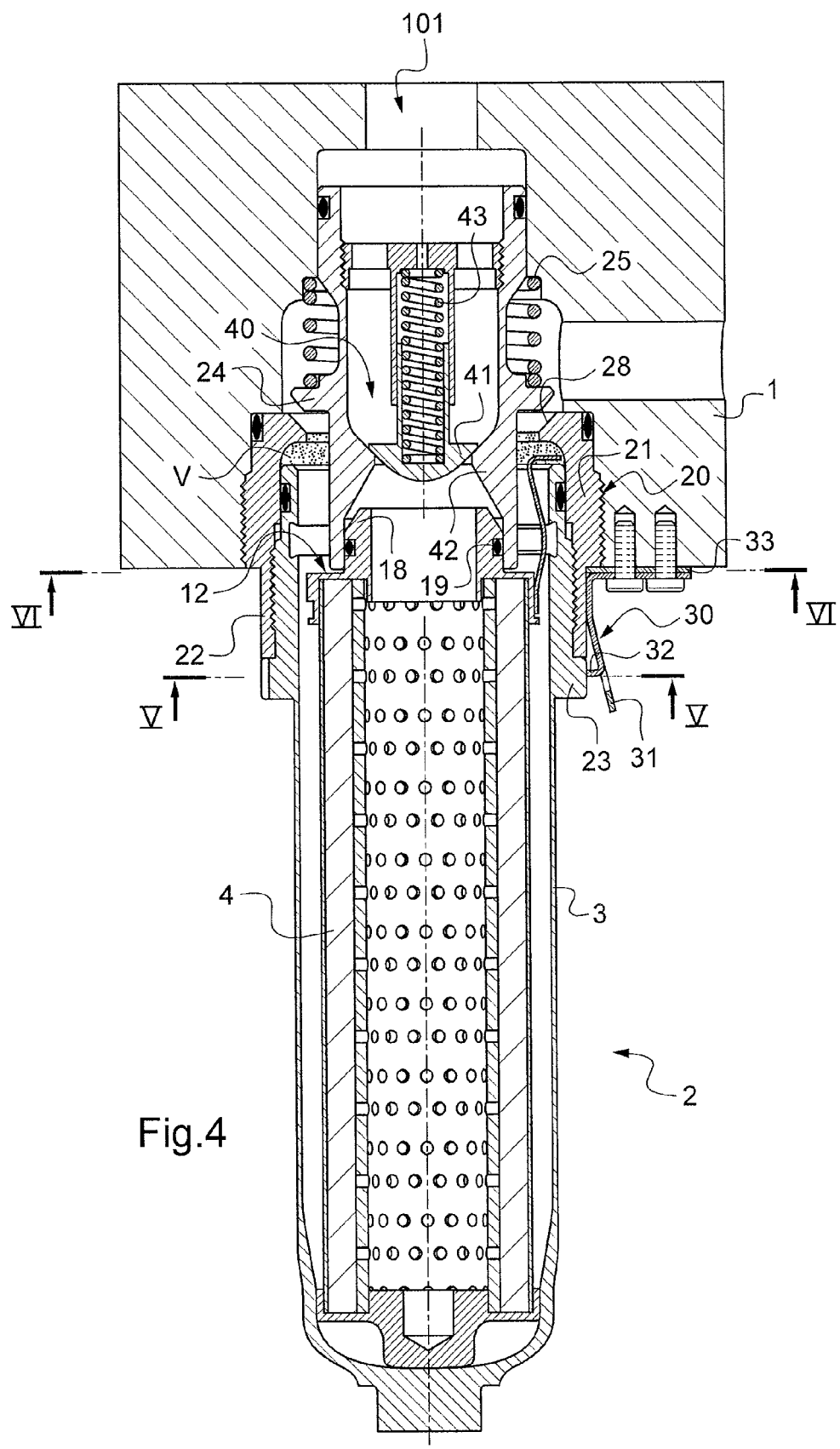
FIG. 4 is a section view of the filter device of the invention with the filter of FIG. 3 in place on the hydraulic block.

According to the invention, and with reference to FIGS. 1 and 2, the filter device for an aircraft hydraulic circuit includes a filter 2 comprising a vessel 3 that receives a filter cartridge 4. The filter 2 is designed to be fitted to a hydraulic block 1 as can be seen in FIGS. 3 and 4, and that is made out of titanium, in this example.

Figure 7:
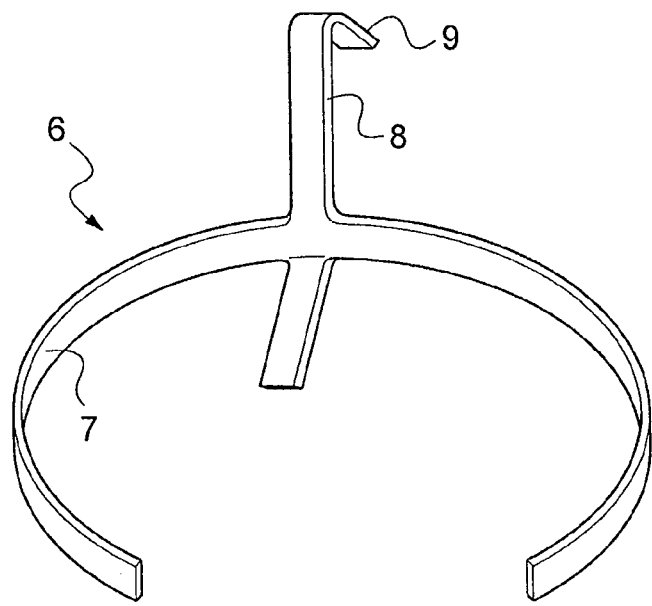
FIG. 7 is a perspective view of a pin fitted to the vessel of FIG. 1.

The vessel 3 has an annular internal groove 5 with a pin 6 inserted therein, which pin can be seen more clearly in FIG. 7. The pin is made of spring steel in this example and comprises a belt 7 that engages resiliently in the inner annular groove 5 of the vessel 3. A key 8 with a curved end 9 projects upwards from the belt 7 so that when the pin 6 is in position on the vessel, its curved end 9 passes over the rim of the vessel 3 and projects radially outside it, as can be seen in FIG. 1. A finger 10 also extends from the belt towards the bottom of the vessel, and is curved towards the center of the vessel 3.

Returning to FIGS. 1 and 2, the cartridge 4 includes a stand 11 that centers the cartridge 4 in the vessel 3, and a hollow cap 12 with a skirt 13 that fits over the outside of the cartridge, and that terminates in a step 14. When the cartridge 4 is put into place in the vessel 3, the finger 10 of the pin 6 is pushed towards the wall of the vessel 3, thereby having the effect of twisting the belt 7 locally and causing the curved end 9 of the key 8 to retract so that the curved end 9 no longer projects radially from the rim of the vessel 3, as can clearly be seen in FIG. 2.

The pin 6 thus performs two functions:

- it prevents the filter 2 being mounted on the hydraulic block 1 unless a cartridge is already in place in the vessel 3. In this situation, as shown in FIG. 3, the curved end 9 prevents the vessel 3 being screwed to the hydraulic block 1; and
- it holds the cartridge 4 in the vessel 3 while the vessel is being removed, by means of the end of the finger 10 co-operating with the step 14 on the cap 12 that forms an obstacle that comes into abutment against the end of the finger 10, such that during removal of the filter, the cartridge 4 is constrained to move with the vessel 3. In order to withdraw the cartridge 4 from the vessel 3 once the filter 2 has been removed from the hydraulic block 1, it is necessary to withdraw the pin 6, or at least to move the finger 10 away from the step 14.

According to a particular aspect of the invention, and with reference to FIGS. 3 and 4, the hydraulic block 1 includes an internal thread 20 receiving an insert 21, here a stainless steel insert, that is screwed therein and tightened with tightening torque that is sufficient to ensure good mechanical behavior of the threads in service. The insert 21 is normally not removed in service, such that the internal thread 20 is not subjected to the fatigue cycling of screwing and unscrewing operations.

Figure 6:
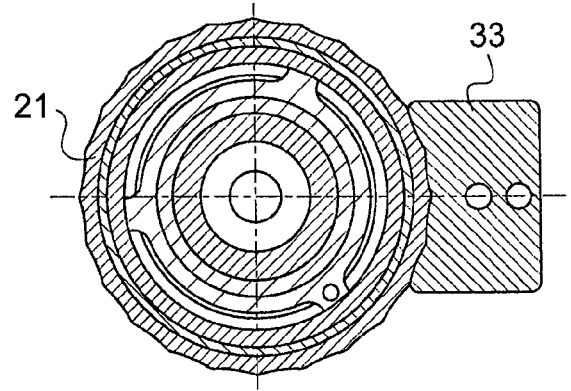
FIG. 6 is a section view on line VI-VI of FIG. 4.

To lock this screw fastening, a tongue 33 is screwed onto the hydraulic block 1 so as to face a peripheral surface of the insert 21, which surface is notched. As can be seen in particular in FIG. 6, the tongue 33 cooperates with the notched peripheral surface of the insert 21 to prevent any unscrewing of the insert.

The vessel 3 is not screwed to the hydraulic block 1, but instead it is screwed into an internal thread 22 of the insert 21. Here, the vessel 3 is screwed in until a shoulder 23 of the vessel 3 comes into contact against the insert 21.

Figure 5:
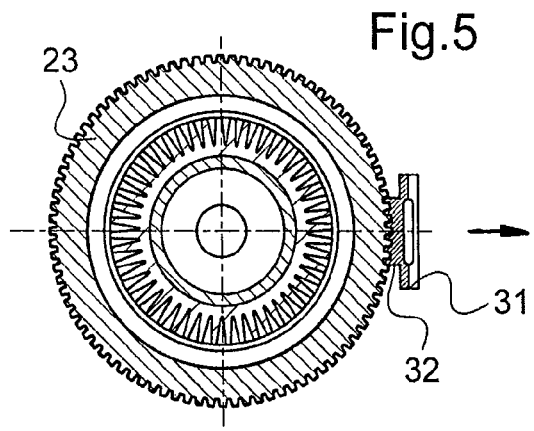
FIG. 5 is a section view on line V-V of FIG. 4.

Returning to FIG. 3, it can be seen that a spring blade 30 is screwed to the hydraulic block (here using the same screws as hold the tongue 33) so as to present a cantilevered portion 31 and a toothed portion 32 that projects towards the shoulder 23 so as to co-operate with peripheral teeth thereof. When the filter is in position on the hydraulic block 1, as shown in FIG. 5, interengagement between the teeth of the shoulder 23 and the teeth of the toothed tab 32 prevents the vessel 3 from turning relative to the hydraulic block 1. This interengagement is shown in FIG. 5. The spring blade 30 is stiff enough to ensure that the various levels of vibration and impacts, in service, cannot cause the toothed tab 32 to separate from the shoulder 23, and thus to ensure that the vessel cannot become unscrewed from the insert 21. In order to enable the vessel 3 to be screwed on or off, it suffices to move the toothed tab 32 resiliently away from the shoulder 23, as represented by the arrow in FIG. 5.

In a variant, the teeth of the toothed tab 32 may present a shape suitable for enabling the toothed tab to be moved away when the vessel is turned so as to unscrew it.

Thus, there is no point in screwing the vessel 3 tight into the internal thread of the insert 21, since the vessel cannot become unscrewed in service. The internal thread 22 receiving the vessel 3 is thus indeed subjected to frequent screwing and unscrewing operations, however it is not subjected to tightening so that these screwing and unscrewing operations do not run any risk of subjecting the internal thread to fatigue damage.

Thus, the internal thread 20 in the hydraulic block 1, which is made of titanium, is indeed subjected to a high level of force, but it is not subjected to any repeated screwing and unscrewing, and therefore does not run any risk of damage, providing it is properly dimensioned. The internal thread 22 made in the insert 21 is indeed subjected to repeated screwing and unscrewing, but not to any significant tightening force, such that it does not run the risk of deteriorating either. Making the insert out of stainless steel provides the opportunity of presenting an internal thread that is relatively insensitive to wear due to screwing and unscrewing operations.

In a particular disposition, the insert 21 forms a seat 28 for a valve member 24 that is movable axially inside the hydraulic block 1. As can be seen in FIG. 3, when the filter is not yet in place on the hydraulic block 1, the valve member 24 co-operates with the seat 28 to close off communication between a first port 100 in the hydraulic block 1 and the inside of the insert 21. In contrast, once the filter is in place, as shown in FIG. 4, the bottom end of the valve member 24 engages a cone 18 on the cap 12 of the cartridge 4 and is pushed back against a spring 25 by the cap 12 so as to open a passage between the port 100 and the outside of the cartridge 4. It should be observed that a gasket 19 extends between the cone 18 and the valve member 24, which gasket tends to retain the cartridge on the valve member 24, while the filter is being removed. The finger 10 of the pin 6 serves specifically to counter this retention and force the cartridge to come away with the vessel while the vessel is being unscrewed.

In the same figure, it can be seen that the valve member 24 is hollow and forms a channel towards a second port 101 of the hydraulic block 1, thereby putting the inside of the cartridge 4 into communication with the second port 101.

Hydraulic fluid can thus flow from the first port 100 towards the second port 101 while passing through the cartridge 4. In order to avoid any fluid returning towards the first port 100, the valve member 24 is fitted internally with a check valve 40 that comprises a check valve member 41 urged by a spring 43 towards a seat 42 formed in the recess in the valve member 24. The check valve member 41 is pushed back against the spring 43 by the fluid coming from inside the cartridge.

It should be observed that when the filter 2 is in position on the hydraulic block 1, a dead volume V of fluid (represented by dots in FIG. 4) extends between the top end of the vessel 3 and the seat 28 of the insert 21.

When the filter 2 is removed from the hydraulic block 1, all of the hydraulic fluid contained in the vessel comes with the filter 2, whereas all of the fluid contained in the hydraulic block 1 above the seat 28 remains in the hydraulic block, being retained by the valve member 24 closing. However, the fluid contained in the dead volume V that extends between the seat 28 and the top end of the vessel 3 is neither contained in the vessel nor retained by the valve member 24.

To prevent the dead volume V spilling to the outside when the filter is removed, the volume occupied by the valve member 24 in the vessel 3 when the filter 2 is in position on the hydraulic block 1 is designed to be greater than the dead volume V. In this way, while the vessel 3 is being unscrewed, the fluid contained in the dead volume V progressively takes up position in the vessel 3 as the valve member 24 moves out from the vessel 3, thereby releasing volume in the vessel 3 that is available for receiving this fluid. By ensuring that the volume that is released is greater than the dead volume V, it is possible to avoid any fluid being spilt to the outside when removing the filter 2, other than a few drops.

The invention is not limited to the above description, but on the contrary covers any variant coming within the ambit defined by the claims.

In particular, although the pin is described as including a belt that is engaged in an annular groove inside the vessel, any technique for fastening the pin inside the vessel could be provided, for example screw fastening or welding.

What is claimed is:

1. An aircraft filter device comprising a hydraulic block adapted to receive removably a filter (2) comprising a vessel (3) receiving a cartridge (4), wherein the vessel is fitted internally with a pin (6) of elastically deformable material comprising firstly a key (8) that extends towards the opening of the vessel and that includes a curved end (9) that projects beyond an edge of the vessel, and secondly a finger (10) that extends towards the bottom of the vessel, and that is oriented towards the center thereof, so that when a cartridge is put into place in the vessel, the finger is pushed back by the cartridge and forces the key to retract so that its curved end no longer projects radially from the vessel, the cartridge being fitted with an external obstacle (14) that co-operates with one end of the finger in order to prevent the cartridge being withdrawn from the vessel.

2. A filter device according to claim 1, wherein the pin comprises a belt (7) engaged in an annular groove inside the vessel (3), the key (8) and the finger (10) extending from opposite sides of the belt.

3. A filter device according to claim 1, wherein the external obstacle of the cartridge is constituted by a step (14) extending at the end of a skirt (13) of a cap (12) fitted overlying the cartridge (4).

* * * * *